(12) United States Patent
Zhang et al.

(10) Patent No.: US 10,637,773 B2
(45) Date of Patent: *Apr. 28, 2020

(54) SERVICE CHAIN HEADER AND METADATA TRANSPORT

(71) Applicant: Futurewei Technologies, Inc., Plano, TX (US)

(72) Inventors: Hong Zhang, Palo Alto, CA (US); Louis Fourie, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,521

(22) Filed: Jun. 15, 2018

(65) Prior Publication Data

US 2018/0302319 A1 Oct. 18, 2018

Related U.S. Application Data

(63) Continuation of application No. 14/806,351, filed on Jul. 22, 2015, now Pat. No. 10,003,530.
(Continued)

(51) Int. Cl.
*H04L 12/725* (2013.01)
*H04L 29/08* (2006.01)
(Continued)

(52) U.S. Cl.
CPC ........ *H04L 45/306* (2013.01); *H04L 67/2804* (2013.01); *H04L 67/288* (2013.01);
(Continued)

(58) Field of Classification Search
CPC ....... H04L 45/00; H04L 45/30; H04L 45/306; H04L 67/2804; H04L 67/288; H04L 69/22
(Continued)

(56) References Cited

U.S. PATENT DOCUMENTS 6,788,680 B1 9/2004 Perlman et al.
7,860,100 B2 12/2010 Khalid et al.
(Continued)

FOREIGN PATENT DOCUMENTS

WO 2015082016 A1 6/2015

OTHER PUBLICATIONS

P. Quinn et al, Network Service Header draft-quinn-sfc-nsh-00.txt. Oct. 7, 2013, 21 pages.
(Continued)

*Primary Examiner* — Rownak Islam

(57) ABSTRACT

Metadata may be embedded in a service chain header (SCH) appended to a packet that is forwarded over a service chain path. The metadata may include information that is used to process the packet at a downstream service function chain (SFC) entity on the service chain path. The metadata TLV field may identify a service action to be performed by a downstream SFC entity. For example, the metadata TLV field may instruct the downstream SFC entity to drop the packet, to redirect the packet (or a traffic flow associated with the packet), to mirror a traffic flow, to terminate a communication connection, to start or stop a packet accounting, and/or to apply a higher grade of service. In another embodiment, the metadata TLV field specifies an OAM service action list that identifies service actions that have been performed on the packet.

32 Claims, 7 Drawing Sheets

Related U.S. Application Data

(60) Provisional application No. 62/027,423, filed on Jul. 22, 2014.

(51) Int. Cl.
   *H04L 29/06* (2006.01)
   *H04L 12/701* (2013.01)

(52) U.S. Cl.
   CPC .............. *H04L 69/22* (2013.01); *H04L 45/00* (2013.01); *H04L 45/30* (2013.01)

(58) Field of Classification Search
   USPC .................................................. 370/389, 392
   See application file for complete search history.

(56) References Cited

U.S. PATENT DOCUMENTS

| | | | |
|---|---|---|---|
| 8,442,043 | B2 | 5/2013 | Sharma et al. |
| 2003/0088699 | A1 | 5/2003 | Luciani et al. |
| 2005/0047329 | A1 | 3/2005 | Almog et al. |
| 2008/0137569 | A1 | 6/2008 | Sang et al. |
| 2008/0198849 | A1* | 8/2008 | Guichard ............ H04L 12/4675 370/392 |
| 2009/0074413 | A1 | 3/2009 | Bannai et al. |
| 2014/0025790 | A1 | 1/2014 | Robitaille et al. |
| 2014/0078915 | A1* | 3/2014 | Edsall .................... H04L 43/08 370/252 |
| 2014/0321459 | A1 | 10/2014 | Kumar et al. |
| 2014/0334488 | A1 | 11/2014 | Guichard et al. |
| 2014/0351106 | A1 | 11/2014 | Furr et al. |
| 2014/0362682 | A1 | 12/2014 | Guichard et al. |
| 2014/0362857 | A1 | 12/2014 | Guichard et al. |
| 2014/0376405 | A1* | 12/2014 | Erickson ............... H04W 76/10 370/254 |
| 2015/0103691 | A1 | 4/2015 | Bhattacharya et al. |
| 2015/0215172 | A1 | 7/2015 | Kumar et al. |
| 2015/0281050 | A1 | 10/2015 | Dutta |
| 2015/0358850 | A1* | 12/2015 | La Roche, Jr. ... H04W 28/0215 370/328 |
| 2017/0019334 | A1* | 1/2017 | Meng .................. H04L 12/6418 |

OTHER PUBLICATIONS

P. Quinn et al, Network Service Header draft-quinn-sfc-nsh-01.txt. Feb. 13, 2014, 21 pages.

P. Quinn et al, Network Service Header draft-quinn-sfc-nsh-02.txt. Feb. 14, 2014, 21 pages.

P. Quinn et al, Network Service Header draft-quinn-sfc-nsh-03.txt. Jul. 3, 2014, 27 pages.

H. Zhang et al, Service Chain Header draft-zhang-sfc-sch-00. Mar. 24, 2014, 15 pages.

P. Quinn et al, Network Service Header (NSH). RFC8300, Jan. 2018, 40 pages.

J. Halpern et al, Service Function Chaining (SFC) Architecture. RFC7665, Oct. 2015, 32 pages.

P. Quinn et al, Network Service Header draft-ieff-sfc-nsh-00.txt. Mar. 24, 2015, 42 pages.

P. Quinn et al, Network Service Header (NSH) draft-ietf-sfc-nsh-18. Jul. 25, 2017, 32 pages.

H. Zhang et al, Service Chain Header draft-zhang-sfc-sch-01. May 9, 2014, 15 pages.

\* cited by examiner

SERVICE CHAIN HEADER AND METADATA TRANSPORT

This patent application is a continuation of U.S. patent application Ser. No. 14/806,351, filed on Jul. 22, 2015, which claims priority to U.S. Provisional Application No. 62/027,423, filed on Jul. 22, 2014 and entitled "Service Chain Header and Metadata Transport," all of which are hereby incorporated by reference herein as if reproduced in their entirety.

TECHNICAL FIELD

The present invention relates to network communications, and, in particular embodiments, to a service chain header and metadata transport.

BACKGROUND

A service chain path may include a sequence of service function instances that reside on various network nodes. When a traffic flow is forwarded over a service chain, packets in the traffic flow are processed by the various service function chain (SFC) entities, with each service function instance applying a service function (e.g., firewall, network access translation (NAT), deep packet inspection (DPI), etc.) prior to forwarding the packets to a next network node. For example, a packet may be forwarded and/or processed by various SFC entities (e.g., a classifier, a service function a forwarder/switch, a router, and an SFC proxy server) in accordance with a service chain header (SCH) information appended in the packet that may be forwarded to the SFC entities over the service chain path.

SUMMARY OF THE INVENTION

Technical advantages are generally achieved, by embodiments of this disclosure which describe service chain header and metadata transport.

In accordance with an embodiment, a method for service chain header processing in a communication network is provided. In this example, the method comprises inserting a metadata Type-Length-Value (TLV) field into a service chain header (SCH) appended to a packet. The SCH comprises a version field that indicates a version associated with the SCH. The metadata Type-Length-Value (TLV) field includes metadata information for processing the packet at a downstream SFC entity on a service chain path. The method further includes forwarding the packet to the downstream SFC entity over the service chain path In accordance with another embodiment, a method for service chain header processing in a communication network is provided. In this example, the method comprises receiving, by a downstream service function chain (SFC) entity, a packet over a service chain path, wherein the packet includes a service chain header (SCH) comprising a version field that indicates a version associated with the SCH and a metadata Type-Length-Value (TLV) field including metadata information. The method further includes processing the packet in accordance with the metadata information included in the metadata TLV field embedded in the SCH. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
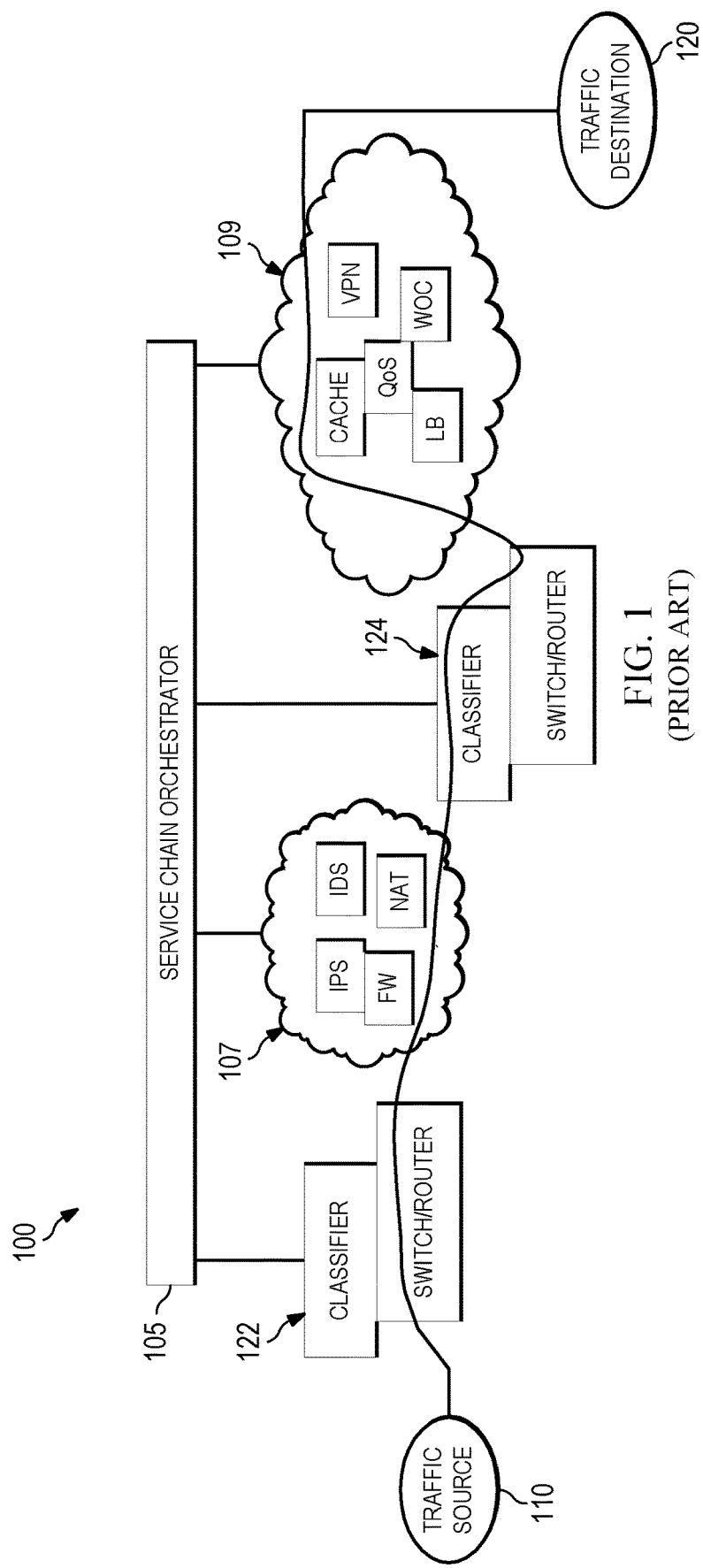
FIG. 1 illustrates a diagram of a conventional service chain path.

The structure, manufacture and use of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A service function chain is a traffic steering technology for applying an ordered set of network service function instances to traffic flows between two network nodes. Metadata information associated with a packet may be used to reduce an amount of overhead and transportation latency at network nodes (e.g., avoiding deep packet inspection (DPI)) over a service chain path. In addition, a service chain header (SCH) appended to a packet may carry information associated with an SFC entity over a service chain path. Accordingly, it may be beneficial that an SCH includes metadata information to minimize network overhead and provide agile delivery service in a communication network. More specifically, the SCH may include variable length metadata information comprising different types of metadata (e.g., vendor specific metadata) to forward and/or perform processing on the packet over the service chain path. Therefore, techniques for forwarding and processing the SCH including metadata information over the service chain path are needed.

Aspects of this disclosure embed one or more metadata Type-Length-Value (TLV) fields in to an SCH of a packet to reduce overhead and provide agile delivery service over a service chain path. The metadata TLV field includes metadata information for processing the packet at a downstream SFC entity on the service chain path. In one embodiment, the metadata TLV field includes operation administration and management (OAM) metadata that identifies a service action to be performed by a downstream SFC entity. For example, the metadata TLV field may instruct the downstream SFC entity to drop the packet, to redirect the packet (or a traffic flow associated with the packet), to mirror a traffic flow, to terminate a communication connection, to start or stop a packet accounting, and/or to apply a higher grade of service. In another embodiment, the metadata TLV field specifies an OAM service action list that identifies service actions that have been performed on the packet. In yet another embodiment, the metadata TLV field specifies a target address that may be used to transport an original destination internet protocol (IP) address to the terminating SFF 216 over a service chain path. Additionally, the metadata TLV field may include a private (P) field that indicates whether metadata information in the metadata TLV field is vender specific metadata, and an organizational unique identifier (OUI) field that indicates a vendor specific ID associated with the metadata. The SCH may include various fields associated with the metadata TLV, such as a version field and a metadata length field. The version field indicates a version associated with the SCH. In one embodiment, the structure of the SCH may be changed/updated, in which case one version may be associated with the old SCH structure, while another version is associated with the new SCH structure. Next-generation SFC entities capable of processing both the old SCH structure and the new SCH structure may then use the version number in the SCH to determine how to process the SCH. Legacy SFC entities that are incapable of processing the new SCH structure may ignore SCHs that indicate the new version. The metadata length field indicates a total length associated with the one or mode metadata TLV fields. These and other details are described in greater detail below.

FIG. 1 illustrates a diagram of a conventional service chain path 100. As shown, the service chain path 100 comprises a service chain orchestrator 105, a traffic source 110, a traffic destination 120, a first service network 107, a second service network 109, a first classifier (switch/router) 122, and a second classifier (switch/router) 124. The service orchestrator 105 controls a traffic flow between the traffic source 110 and the traffic destination 120 through the classifiers 122, 124 and the service networks 107, 109. When the first classifier 122 receives a packet from the traffic source 110 (e.g., source device), the first classifier 122 performs processing on the packet according to classification rules defined in an SFC policy table prior to forwarding the packet to a next network node (e.g., service function chain (SFC) entity) included in the first service network 107. The first service network 107 may provide service function s (e.g., intrusion prevention system (IPS), intrusion detection system (IDS), firewall (FW), network address translation (NAT), etc.). The packet processed by the first service network 107 is then forwarded to the second classifier 124. Similar to the first classifier 122, the packet is classified and marked with a corresponding SFC identifier (ID) based on an SFC policy table implemented in the second classifier 124, and then forwarded to an SFC entity included in the second service network 109. The second service network 109 may provide service functions (e.g., cache, a quality of control (QoS), virtual private network (VPN), wide area network optimization controller (WOC), network load balancing (LB), etc.). In addition, metadata associated with a packet being transported over the service chain 100 may be inserted into a service chain header appended to the packet. More specifically, the metadata may convey information (e.g., vendor specific information) that is not readily available at an SFC entity over the service chain path 100.

Accordingly, transportation techniques for the SCH and metadata information to utilize the SFC entity for forwarding and processing on the packet over the service chain 100 are needed.

Figure 2:
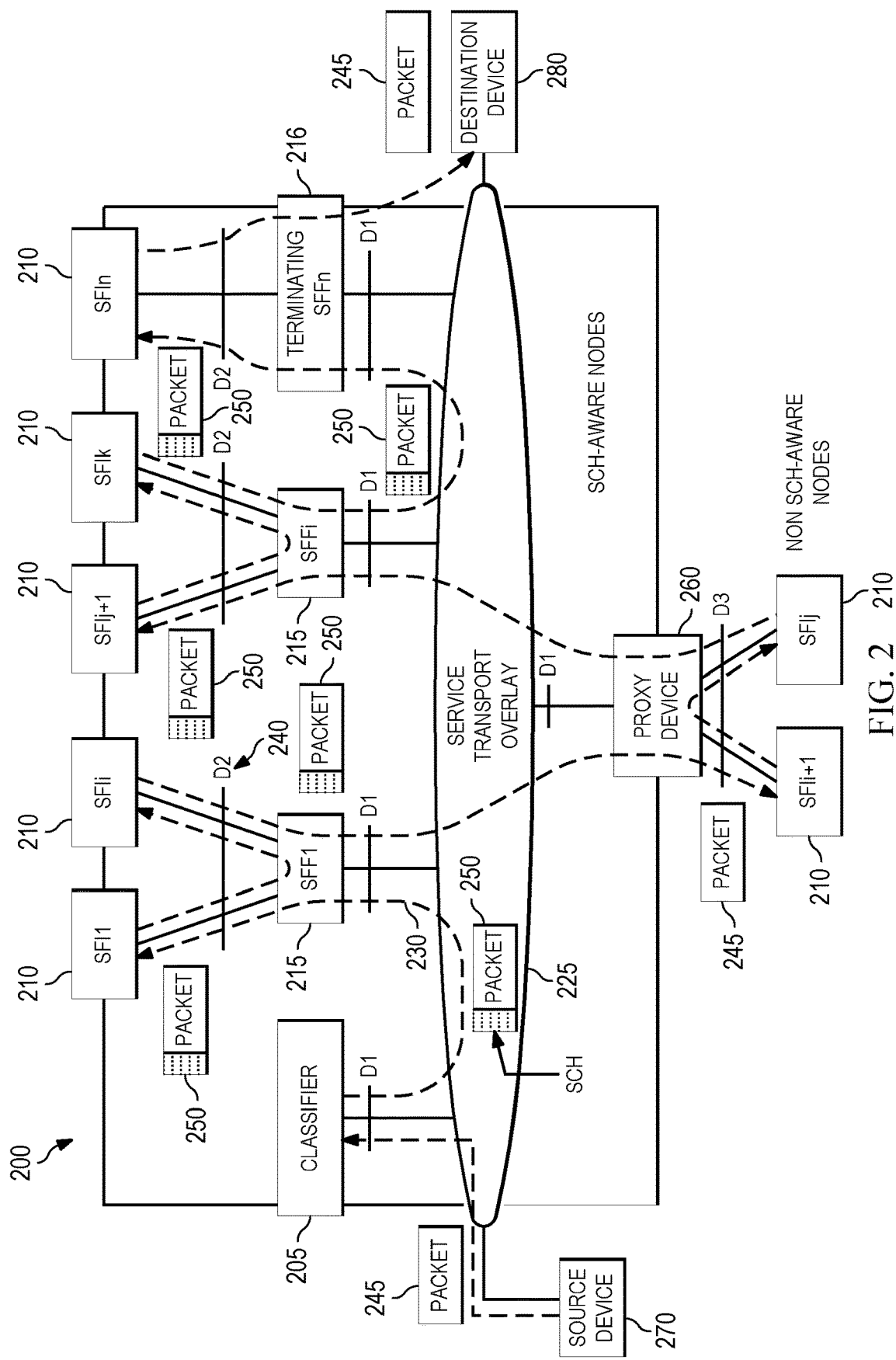
FIG. 2 illustrates a diagram of an embodiment service chain path.

FIG. 2 illustrates an embodiment service chain path 200. As shown, the service chain 200 comprises a classifier 205, service function instances (SFIs) 210, service function forwarders (SFFs) 215, a service transport overlay 225, a proxy device 260, a source device 270, and destination device 280. An SFC entity may be any node on a service chain path e.g., a classifier node, a service function forwarder, a router node, a service function instance, an SFC proxy server. A data plane service function chain (SFC) 230 begins at an ingress classifier 205 and extends through various SFs 210 and the SFFs 215, and then may terminate at the SFF 216. The SFF 216 is the last entity on the service chain path, and is referred to as the "terminating SFF 216" throughout this disclosure. As shown, the data plane SFC 230 includes an interface D1 extending between the service transport overlay 225 and the classifier 205 and an interface D2 240 extending between the SF 210 and the SFF 215. The data plane SFC also includes interfaces D1 extending between the service transport overlay 225 and the SFFs 215, 216. The classifier 205 may be configured to classify a traffic flow. For example, the classifier 205 may determine that an incoming traffic flow is associated with the data plane SFC 230. The SFFs 215, 216 may be components of a service function forwarding plane that are responsible for forwarding packets in a traffic flow to the next-hop service function on the data plane SFC 230. The SFs 210 may be data plane entities on the data plane SFC 230 that perform service functions on traffic flows forwarded over the data plane SFC 230.

As shown, the source device 270 generates a packet 245 and then forwards the packet 245 to the classifier 205 through the service transport overlay 225. The classifier 205 appends a service chain header (SCH) (e.g., the SCH 300 depicted in FIG. 3) including metadata Type-Length-Value (TLV) field to the packet 245, and then forwards a packet 250 (i.e., the packet 245 including the SCH comprising metadata TLV fields) to the SFFs 215, which forwards the packet 250 to the SFIs 210. When the SFIs 210 receive the packet 250 through the SFFs 215, the SFIs 210 process the packet 250 in accordance with metadata carried on the metadata TLV field embedded in the SCH appended to the packet 250. In one embodiment, the metadata TLV field includes operation administration and management (OAM) metadata that identifies service actions to be performed by the SFIs 210. The service actions identified by the metadata information may specify dropping a packet, redirecting a traffic flow, mirroring a traffic flow, terminating a communication connection, starting/stopping a packet accounting, applying a higher grade of service, or a combination thereof. An SFC entity may mirror a traffic flow (i.e., replicate packets in the traffic flow) for various reasons, such as to perform troubleshooting or monitoring or when performing a lawful intercept. In another embodiment, the metadata TLV field includes an OAM service action list that identifies service actions that have already been performed on the packet. In yet another embodiment, the metadata TLV field specifies a service action to be performed by a downstream SFC entity. In yet another embodiment, the metadata TLV field specifies a target address that is used to carry an original destination internet protocol (IP) address of the terminating SFF 216 over a service chain. The terminating SFF 216 removes the SCH from the packet 250 and then forwards the packet 245 to the destination device 280.

Figure 3:
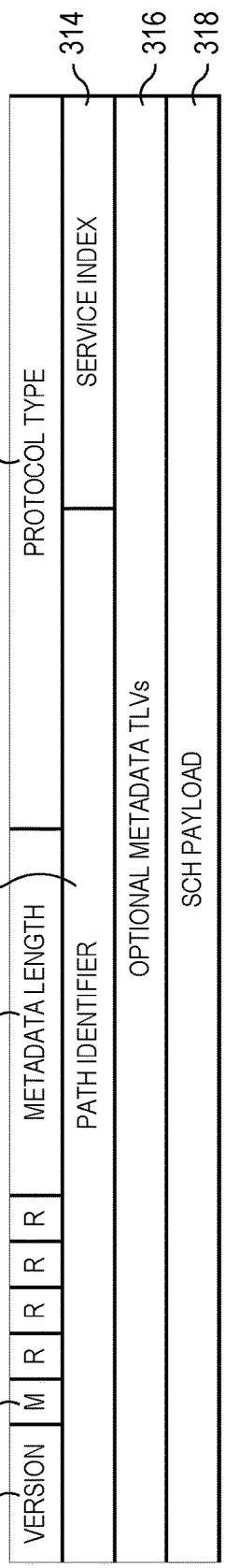
FIG. 3 illustrate a diagram of an embodiment service chain header.

FIG. 3 illustrates a diagram of an embodiment service chain header 300. An upstream SFC entity adds metadata TLVs to a service chain header (SCH) of a packet when the SFC entity receives the packet from a source device. In some embodiments, this may include appending the SCH to the packet, as may be the case if the upstream SFC entity is a classifier or proxy device. In other embodiments, this may include adding metadata to existing SCH of the packet, as may be the case if the upstream SFC entity is located in the middle of the service chain path. As shown, the SCH 300 comprises a version field 302, a management (M) field 304, a set of reserved fields 306, a metadata length field 308, a protocol type field 310, a path identifier (ID) field 312, a service index field 314, an optional metadata TLV field 316, and an SCH payload field 318. The version field 302 indicates a version number of the SCH 300 appended in the packet to be forwarded over a service chain path. The M field 304 indicates that the packet is an OAM packet. A downstream SFC entity examines the optional metadata TLV field 316 to perform a service action associated with OAM function when the M field 304 is set (active high or low). The metadata length field 308 indicates a total length of the optional metadata TLV field 316. The protocol type field 310 indicates an Institute of Electrical and Electronics Engineers (IEEE) EtherType associated the packet. The path ID field 312 identifies a service chain path that is composed of a sequence of SFIs. The downstream SFC entity uses the path ID field 312 to identify a next-hop SFC entity for forwarding the packet over the service chain path. The service index field 314 identifies an index number of service function instances associated with the service chain path. The optional metadata TLV fields 316 include metadata information that may be used to process the packet at the downstream SFC entity. The SCH payload field 318 includes payload information associated with the packet. The downstream SFC entity removes the SCH 300 from the packet and forward the packet to a destination device.

Figure 4:
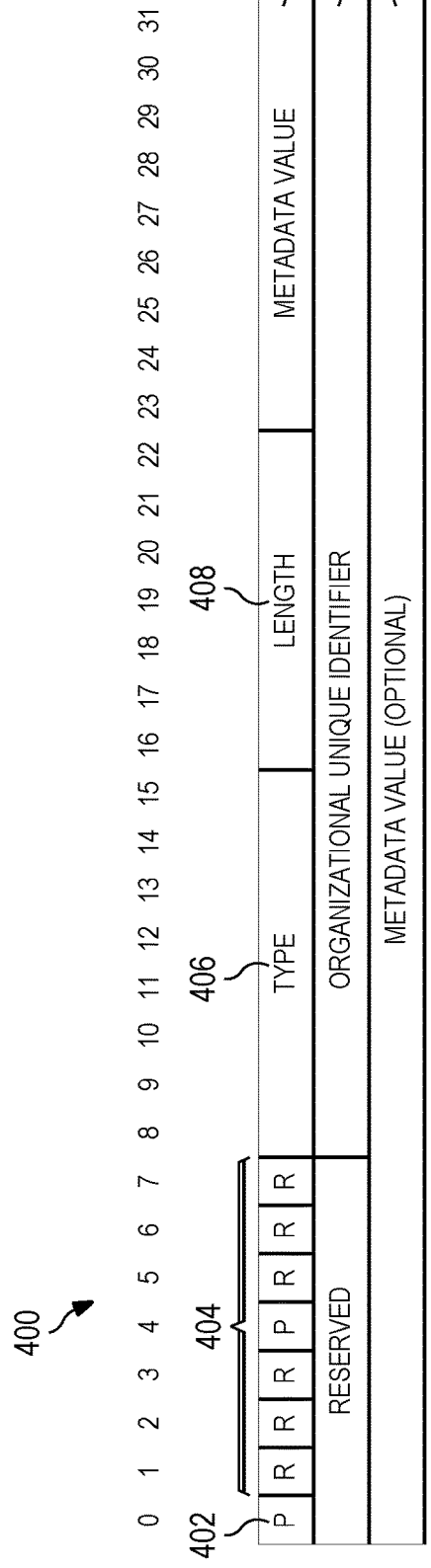
FIG. 4 illustrates a diagram of an embodiment metadata Type-Length-Value (TLV)

FIG. 4 illustrates a diagram of an embodiment metadata Type-Length-Value (TLV). The metadata TLV 400 is a variable length field carrying metadata information to be used by a downstream SFC entity when processing the packet. The metadata provides information about the packet that may not be available to downstream SFC entities. As shown, the metadata TLV 400 comprises a private (P) field 402, a set of reserved fields 404, a type field 406, a length field 408, a metadata value field 410, an optional organizational unique identifier (OUI) field 412, and an optional metadata value field 414. The P field 402 indicates whether the OUI field 412 is present in the metadata TLV 400. For example, the OUI field 412 is present when the P field 402 is set to one. The type field 406 indicates a type associated with the metadata carried in the metadata TLV 400. In one embodiment, the type field 406 indicates a type associated with the OUI field 412. In one embodiment, the length field 408 indicates a total length of the metadata value field 410. In another embodiment, the length field 408 indicates a total length of the metadata value field 410 and the optional metadata value field 414. The metadata value field 410 includes metadata information that is used to process the packet at a downstream SFC entity. The OUI field 412 identifies a vender specific identifier when present. The optional metadata value field 414 includes additional metadata information, and is added at the end of the metadata TLV 400 when the metadata value field 410 is not sufficient to carry all the metadata information associated with the packet.

In one embodiment, the metadata TLV 400 includes OAM metadata that identifies a service action to be performed by the downstream SFC entity. For instance, the OAM metadata may instruct the downstream SFC entity to drop a packet, redirect a traffic flow, mirror a traffic flow, terminate a communication connection, start/stop a packet accounting, apply a higher grade of service to the packet or a combination thereof. In another embodiment, the metadata TLV 400 includes an OAM service action list that identifies service actions that have already been performed on the packet. In yet another embodiment, the metadata TLV 400 specifies a service action to be performed by a downstream SFC entity. In yet another embodiment, the metadata TLV 400 specifies a target address that is used to transport an original destination internet protocol (IP) address to a terminating SFF over the service chain.

Figure 5:
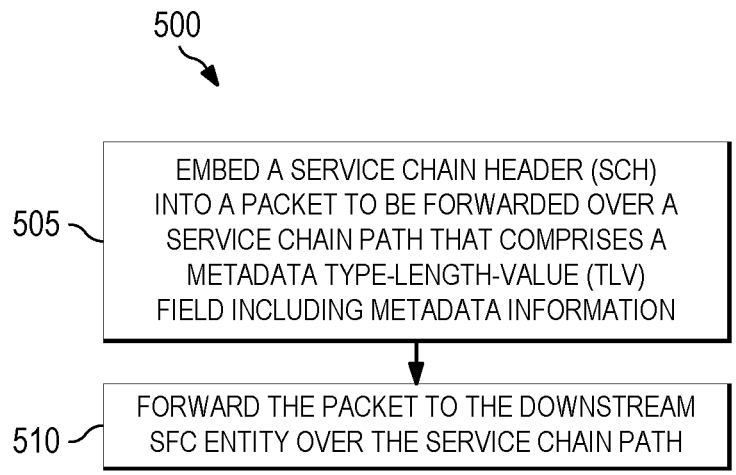
FIG. 5 illustrates a flowchart of an embodiment method for communicating metadata over a service chain path.

FIG. 5 illustrates a flowchart of an embodiment method 500 for communicating metadata over a service chain path, as might be performed by an upstream service function chain (SFC) entity (e.g., a classifier) over a service chain path. The method 500 begins at step 505, where the upstream SFC entity appends a service chain header (SCH) into a packet to be forwarded over a service chain path. The SCH comprises a version field indicating a version associated with the SCH, a metadata length field indicating a total length associated with the metadata TLV field, and a metadata Type-Length-Value (TLV) field including metadata information to be used by a downstream SFC entity on the service chain path. The metadata TLV field includes a private (P) field indicating whether an organizational unique identifier (OUI) field is present in the metadata TLV field, a type field indicating a type associated with the metadata TLV, a length field indicating a total length of the metadata TLV, a metadata value field including metadata information. In some embodiments, the metadata TLV further includes an OUI field indicating that the metadata information in the metadata TLV is vender specific metadata. Subsequently, the method 500 proceeds to step 510, where the upstream SFC entity forwards the packet to the downstream SFC entity over the service chain path.

Figure 6:
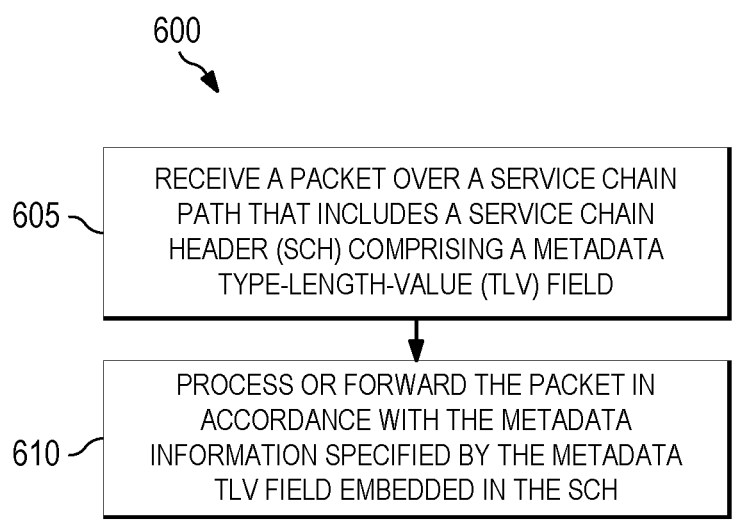
FIG. 6 illustrates a flowchart of an embodiment method for service chain header (SCH) processing.

FIG. 6 illustrates a flowchart of an embodiment method 600 for service chain header (SCH) processing, as might be performed by a downstream service function chain (SFC) entity on a service chain path. The method 600 begins at step 605, where the downstream SFC entity receives a packet over a service chain path. The packet includes an SCH that comprises a version field indicating a version associated with the SCH, a metadata length field indicating a total length associated with the metadata Type-Length-Value (TLV) field, and a metadata TLV field including metadata information. Subsequently, the method 600 proceeds to step 610, where the downstream SFC entity processes the packet in accordance with the metadata information specified by the metadata TLV field embedded in the SCH of the packet. In one embodiment, a downstream SFC entity performs processing on a packet in accordance with a service action specified by operation administration and management (OAM) metadata embedded in the SCH of the packet.

A Network Service Header (NSH) contains metadata and service path information that are added to a packet or frame and used to create a service plane. The packets and the NSH are then encapsulated in an outer header for transport. The service header is added by a service classification function—a device or application—that determines which packets require servicing, and correspondingly which service path to follow to apply the appropriate service.

Figure 7:
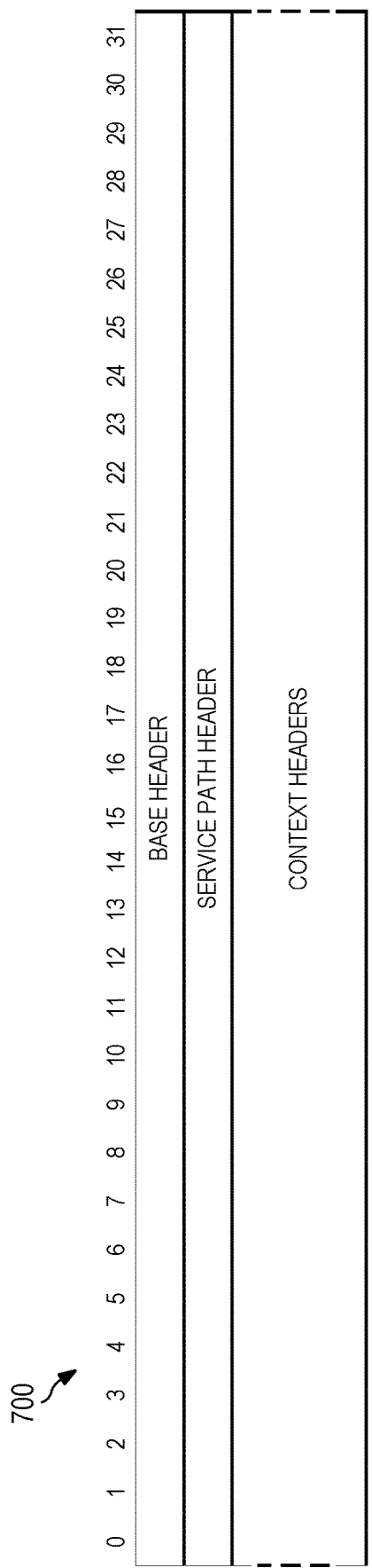
FIG. 7 illustrates a diagram of an embodiment network service header (NSH)

FIG. 7 illustrates a network service header 700. As shown, the NSH 700 is composed of a 4-byte base header, a 4-byte service path header and fixed length context headers. The base header provides information about the service header and the payload protocol. The service path header provides path identification and location information within a path.

Figure 8:
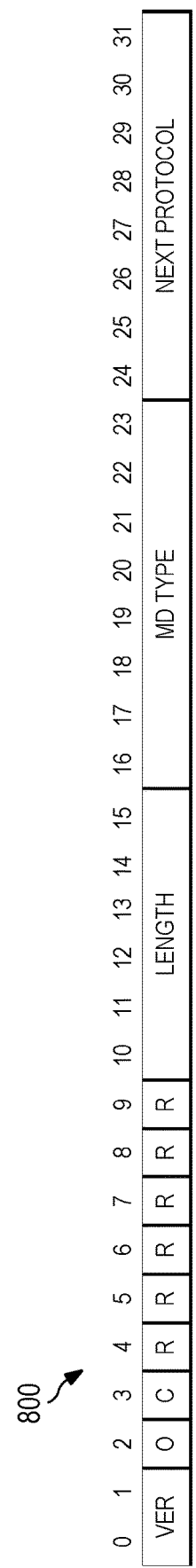
FIG. 8 illustrates a diagram of an embodiment NSH base header.

FIG. 8 illustrates an embodiment NSH base header 800. The base header field comprises version field indicates a version of the NSH and is used to ensure backward compatibility going forward with future NSH updates. The 0 bit indicates that a packet is an operations and management (OAM) packet. In some embodiments, SFF and SFs entities/nodes are required to examine the payload and take appropriate action (e.g., return status information). The C bit indicates whether a critical metadata TLV is present. This bit may act as an indication for hardware implementers to decide how to handle the presence of a critical TLV without necessarily needing to parse all TLVs present. In one embodiment, the C bit must be set to 1 if one or more critical TLVs are present. The length field indicates a total length, in 4-byte words, of the NSH header, including optional variable TLVs. The MD Type field indicates the format of NSH beyond the base header and the type of metadata being carried. This typing is used to describe the use for the metadata. A new registry may be defined by IANA for the MD Type. The NSH may define two MD types. One type (0x1) indicates that the format of the header includes fixed length context headers. Another type (0x2) may contain optional variable length metadata information.

Figure 9:
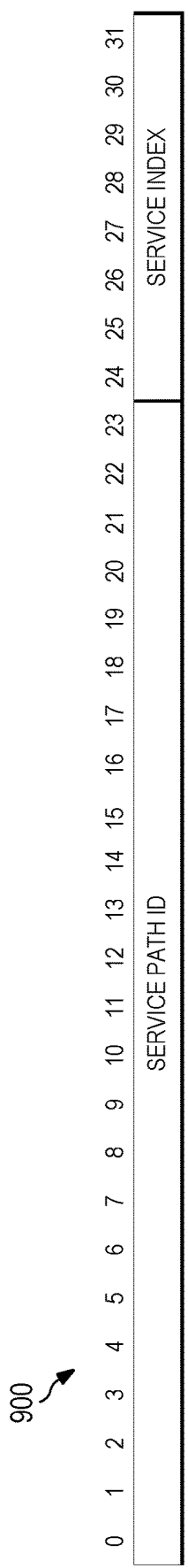
FIG. 9 illustrates a diagram of an embodiment service path header.

FIG. 9 illustrates an embodiment service path header 900 that includes a Service Path Identifier (SPI) that identifies a service path. Participating nodes may use this identifier for path selection. An administrator can use the service path value for reporting and troubleshooting packets along a specific path. The service path header 900 further includes a Service Index (SI) that identifies a location within the service path. Service index may be decremented by SFIs or proxy nodes after performing required services, and may be used in conjunction with service path for path selection. Service Index is also valuable when troubleshooting or reporting service paths. The SI can also be used for loop detection. The terms "SCH" and "NSH" are used interchangeably throughout this disclosure.

Figure 10:
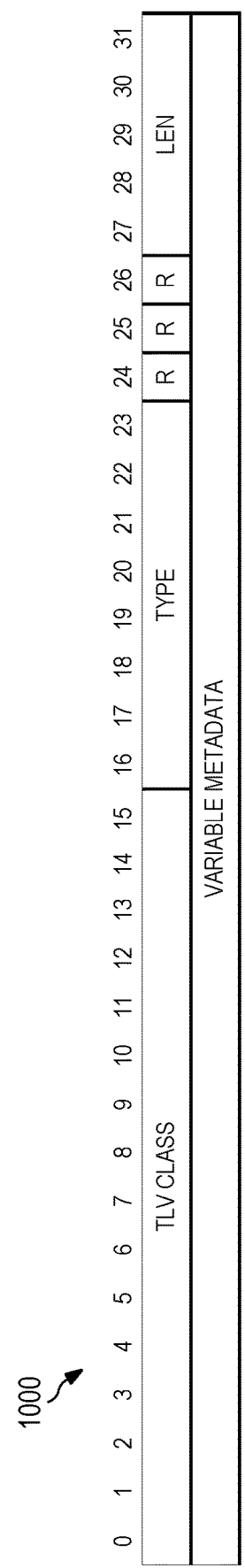
FIG. 10 illustrates a diagram of an embodiment metadata TLV.

FIG. 10 illustrates a diagram of an embodiment metadata TLV. As shown, the metadata TLV includes a TLV class field, a type field, reserve fields, a length field, and a variable metadata field. The TLV class describes the scope of the type field. In some cases, the TLV Class will identify a specific vendor, in others, the TLV class will identify specific standards body allocated types. The type field indicates a specific type of information being carried in the variable metadata field, within the scope of a given TLV Class.

In an embodiment, the most significant bit of the type field indicates whether the metadata TLV is mandatory for the receiver to understand/process. In an embodiment, type values 0 to 127 are allocated for non-critical option, while type values 128 to 255 for critical options. In an embodiment, a receiver may be required to drop a packet when a metadata TLV in the SCH of the packet has a type field indicating a critical bit, and the receiver does not understand how to process the type of metadata. In the same or other embodiments, transmitters may be required not to drop packets having a metadata TLV in the SCH that has a type field indicating a critical bit. The length field indicates a length of the variable metadata field in 4-byte words.

Figure 11:
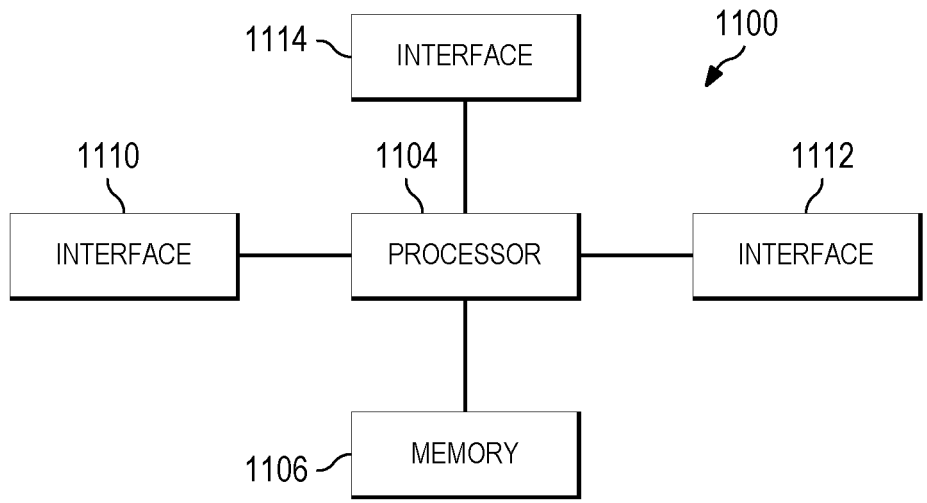
FIG. 11 illustrates a diagram of an embodiment communications device.

FIG. 11 illustrates a block diagram of an embodiment processing system 1100 for performing methods described herein, which may be installed in a host device (e.g., an SFC entity). The processing system 1100 may be suitable for implementing one or more embodiments of the components disclosed herein. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
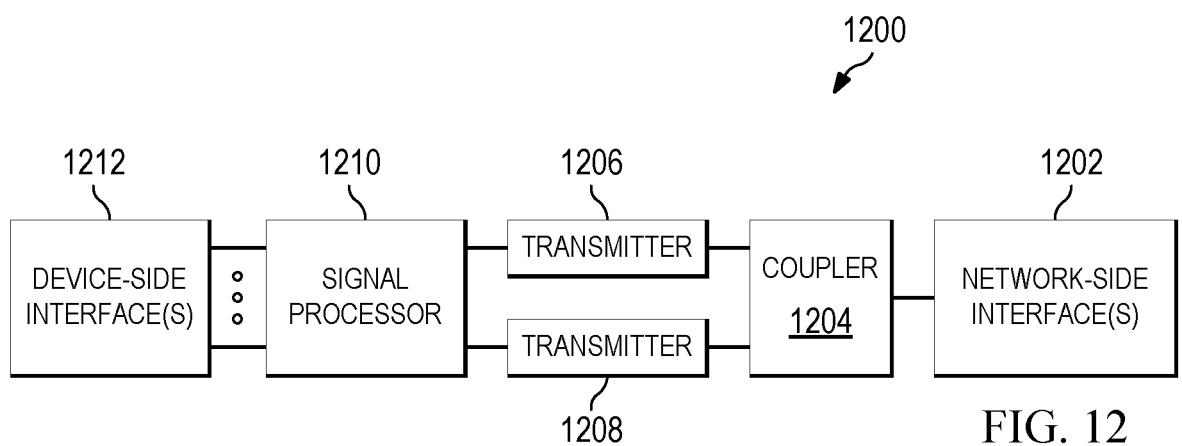
FIG. 12 illustrates a diagram of an embodiment computing platform.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device (e.g., an SFC entity). The transceiver 1200 may be suitable for implementing one or more embodiments of the components disclosed herein. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:

[1] Khalid et al., U.S. Pat. No. 7,860,100, "Service Path Selection in a Service Network," issued Dec. 28, 2010.
[2] Quinn et al., Network Service Header, IETF draft-quinn-sfc-nsh-03.txt, Jul. 3, 2014.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for processing packets for a service chain in a communication network, the method comprising:
   receiving, by a first service function chain (SFC) entity, a first packet;
   generating, by the first SFC entity, a second packet, wherein the second packet comprises a packet header for the service chain and the first packet, wherein the packet header for the service chain comprises a metadata Type-Length-Value (TLV) field and a metadata length field, wherein the metadata TLV field comprises a type field, a length field and a metadata value field, wherein the type field indicates a type of information carried in the metadata value field, the length field indicates a length of the metadata value field, the metadata value field contains metadata, and the metadata length field in the packet header indicates a length of the metadata TLV field; and
   forwarding, by the first SFC entity, the second packet to a second SFC entity.

2. The method of claim 1, wherein the metadata TLV field further comprises a TLV class field, wherein the TLV class field describes a scope of the type field.

3. The method of claim 1, wherein the metadata TLV field comprises a TLV class field, a type field immediately following the TLV class field, one or more reserved fields immediately following the type field, a length field immediately following the one or more reserved fields, and a metadata value field.

4. The method of claim 1, wherein the packet header for the service chain further comprises a version field for backward compatibility.

5. The method of claim 1, wherein the first SFC entity is a classifier, or an SFC Proxy.

6. The method of claim 1, wherein the second SFC entity is a service function forwarder (SFF).

7. A method for processing packets for a service chain in a communication network, the method comprising:
   receiving, by a service function chain (SFC) entity, a packet, wherein the packet includes a packet header for service chain comprising a metadata Type-Length-Value (TLV) field and a metadata length field, wherein the metadata TLV field comprises a type field, a length field and a metadata value field, wherein the type field indicates a type of information carried in the metadata value field, the length field indicates a length of the metadata value field, the metadata value field contains metadata, and the metadata length field in the packet header indicates a length of the metadata TLV field; and
   processing, by the SFC entity, the packet in accordance with the metadata included in the metadata TLV field embedded in the packet header for the service chain.

8. The method of claim 7, wherein the metadata TLV field further comprises a TLV class field, wherein the TLV class field describes a scope of the type field.

9. The method of claim 7, wherein the metadata TLV field comprises a TLV class field, a type field immediately following the TLV class field, one or more reserved fields immediately following the type field, a length field immediately following the one or more reserved fields, and a metadata value field.

10. The method of claim 7, wherein the packet header for the service chain further comprises a version field for backward compatibility.

11. The method of claim 7, wherein the SFC entity is a service function instance.

12. The method of claim 7, wherein the packet is received from another SFC entity, wherein the another SFC entity is a classifier, an SFC Proxy, a service function instance, or a service function forwarder (SFF).

13. A method for processing packets for a service chain in a communication network, the method comprising:
   receiving, by a service function chain (SFC) entity, a packet, wherein the packet includes a packet header for the service chain comprising a metadata Type-Length-Value (TLV) field and a metadata length field, wherein the metadata TLV field comprises a type field, a length field and a metadata value field, wherein the type field indicates a type of information carried in the metadata value field, the length field indicates a length of the metadata value field, the metadata value field contains metadata, and the metadata length field indicates a length of the metadata TLV field;
   removing, by the SFC entity, the packet header for the service chain from the packet; and
   sending, the packet without the packet header for the service chain to a destination device.

14. The method of claim 13, wherein the SFC entity is a last service function forwarder (SFF) in a service chain path.

15. The method of claim 13, wherein the metadata TLV field further comprises a TLV class field, wherein the TLV class field describes a scope of the type field.

16. The method of claim 13, wherein the packet header for the service chain further comprises a version field, wherein the version field is for backward compatibility.

17. A first service function chain (SFC) entity comprising:
a processor; and
a non-transitory computer readable storage medium storing programming for execution by the processor to cause the first SFC entity to:
receive a first packet;
generate a second packet, wherein the second packet comprises a packet header for a service chain and the first packet, wherein the packet header for the service chain comprises a metadata Type-Length-Value (TLV) field and a metadata length field, wherein the metadata TLV field comprises a type field, a length field and a metadata value field, wherein the type field indicates a type of information carried in the metadata value field, the length field indicates a length of the metadata value field, the metadata value field contains metadata, and the metadata length field in the packet header indicates a length of the metadata TLV field; and
forward the second packet to a second SFC entity.

18. The first SFC entity of claim 17, wherein the metadata TLV field further comprises a TLV class field, wherein the TLV class field describes a scope of the type field.

19. The first SFC entity of claim 17, wherein the metadata TLV field comprises a TLV class field, a type field immediately following the TLV class field, one or more reserved fields immediately following the type field, a length field immediately following the one or more reserved fields, and a metadata value field.

20. The first SFC entity of claim 17, wherein the packet header for the service chain further comprises a version field for backward compatibility.

21. The first SFC entity of claim 17, wherein the first SFC entity is a classifier, or an SFC Proxy.

22. The first SFC entity of claim 17, wherein the second SFC entity is a service function forwarder (SFF).

23. A service function chain (SFC) entity comprising:
a processor; and
a non-transitory computer readable storage medium storing programming for execution by the processor to cause the SFC entity to:
receive a packet, wherein the packet includes a packet header for a service chain comprising a metadata Type-Length-Value (TLV) field and a metadata length field, wherein the metadata TLV field comprises a type field, a length field and a metadata value field, wherein the type field indicates a type of information carried in the metadata value field, the length field indicates a length of the metadata value field, the metadata value field contains metadata, and the metadata length field in the packet header indicates a length of the metadata TLV field; and
process the packet in accordance with the metadata included in the metadata TLV field embedded in the packet header for the service chain.

24. The SFC entity of claim 23, wherein the metadata TLV field further comprises a TLV class field, wherein the TLV class field describes a scope of the type field.

25. The SFC entity of claim 23, wherein the metadata TLV field comprises a TLV class field, a type field immediately following the TLV class field, one or more reserved fields immediately following the type field, a length field immediately following the one or more reserved fields, and a metadata value field.

26. The SFC entity of claim 23, wherein the packet header for the service chain further comprises a version field for backward compatibility.

27. The SFC entity of claim 23, wherein the SFC entity is a service function instance.

28. The SFC entity of claim 23, wherein the packet is received from another SFC entity, wherein the another SFC entity is a classifier, an SFC Proxy, a service function instance, or a service function forwarder (SFF).

29. A service function chain (SFC) entity comprising:
a processor; and
a non-transitory computer readable storage medium storing programming for execution by the processor, the programming including instructions to:
receive a packet, wherein the packet includes a packet header for a service chain comprising a metadata Type-Length-Value (TLV) field and a metadata length field wherein the metadata TLV field comprises a type field, a length field and a metadata value field, wherein the type field indicates a type of information carried in the metadata value field, the length field indicates a length of the metadata value field, the metadata value field contains metadata, and the metadata length field in the packet header indicates a length of the metadata TLV field;
remove the packet header for the service chain from the packet; and
send the packet without the packet header for the service chain to a destination device.

30. The SFC entity of claim 29, wherein the SFC entity is a last service function forwarder (SFF) in a service chain path.

31. The SFC entity of claim 29, wherein the metadata TLV field further comprises a TLV class field, wherein the TLV class field describes a scope of the type field.

32. The SFC entity of claim 29, wherein the packet header for the service chain further comprises a version field, wherein the version field is for backward compatibility.

* * * * *